United States Patent
Oesterlein et al.

[11] 3,966,705
[45] June 29, 1976

[54] DISULFO NAPHTHALENE CONTAINING FIBER-REACTIVE TETRAZO DYES

[75] Inventors: Fritz Oesterlein, Basel; Henri Riat, Arlesheim, both of Switzerland

[73] Assignee: Ciba-Geigy Corporation, Ardsley, N.Y.

[22] Filed: Dec. 12, 1974

[21] Appl. No.: 532,420

[30] Foreign Application Priority Data
Jan. 4, 1974 Switzerland............................ 61/74
Oct. 22, 1974 Switzerland...................... 14103/74

[52] U.S. Cl................................. 260/153; 260/185; 260/198
[51] Int. Cl.²..................... C09B 43/12; C09B 43/16
[58] Field of Search.................................... 260/153

[56] References Cited
UNITED STATES PATENTS

| | | |
|---|---|---|
| 3,639,662 | 2/1972 | Griffiths et al.................. 260/153 X |
| 3,646,002 | 2/1972 | Andrew et al................... 260/153 X |
| 3,647,778 | 3/1972 | Andrew et al...................... 260/153 |
| 3,658,782 | 4/1972 | Griffiths et al...................... 260/153 |

FOREIGN PATENTS OR APPLICATIONS

| | | |
|---|---|---|
| 2,033,253 | 1/1971 | Germany............................ 260/153 |

*Primary Examiner*—Charles F. Warren
*Attorney, Agent, or Firm*—Joseph G. Kolodny; Edward McC. Roberts; Prabodh I. Almaula

[57] ABSTRACT

Fiber-reactive tetrazo dyes of the formula

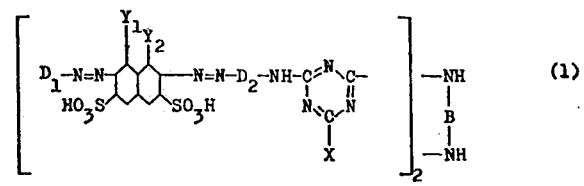

wherein each of $D_1$ and $D_2$ represents a benzene residue which contains at least one sulphonic acid group, one of the two substituents $Y_1$ and $Y_2$ represents the HO group and the other represents the $H_2N$ group, X represents a halogen atom and B represents a benzene residue which is devoid of sulphonic acid groups, are suitable dyes for dyeing and printing materials of the most diverse kind, especially for dyeing of cellulosic materials of fibrous structure by the exhaustion process. The dyes are characterized by increased reactivity and high degree of fixation.

3 Claims, No Drawings

DISULFO NAPHTHALENE CONTAINING FIBER-REACTIVE TETRAZO DYES

The present invention provides fibre-reactive tetrazo dyes of the formula

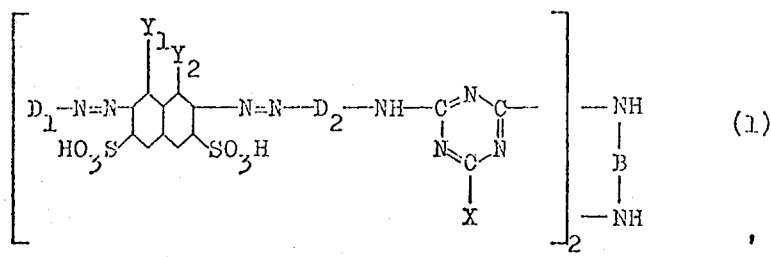

wherein each of $D_1$ and $D_2$ represents a benzene residue which contains at least one sulphonic acid group, one of the two substituents $Y_1$ and $Y_2$ represents the HO group and the other represents the $H_2N$ group, X represents a halogen atom and B represents a benzene residue which is devoid of sulphonic acid groups.

In addition to containing sulphonic acid groups, the benzene residues $D_1$ and $D_2$ can contain additional substituents which are customary in azo dyes, for example alkyl, alkoxy, halogen, nitro, cyano, carboxy, acyloxy, alkylcarbonyl, arylcarbonyl, alkoxycarbonyl, amino, acylamino, alkylsulphonyl, arylsulphonyl and aminosulphonyl. Preferably, each of $D_1$ and $D_2$ contains one sulphonic acid group but no additional substituents. Preferred fibre-reactive tetrazo dyes of the formula (1) are those wherein $Y_1$ represents the $H_2N$ group and $Y_2$ represents the HO group. The halogen atom X is a fluorine, chlorine or bromine atom; preferably X is a chlorine atom. The benzene residue B can also contain the substituents cited in respect of $D_1$ and $D_2$, but does not contain a sulphonic acid group. Preferably, the benzene residue contains no additional substituents.

A preferred embodiment of the fibre-reactive tetrazo dyes of the formula (1) therefore comprises fibre-reactive tetrazo dyes of the formula.

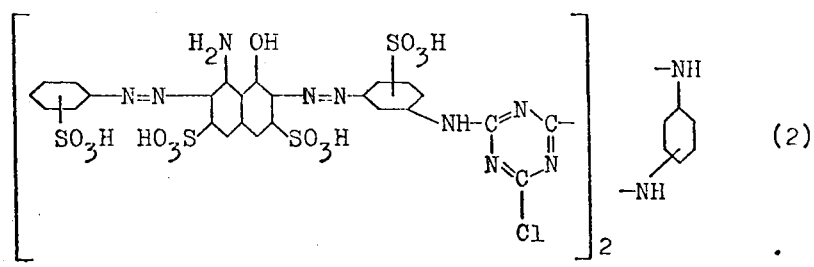

A particularly useful dye of the kind defined by the formula (2) is the fibre-reactive tetrazo dye of the formula

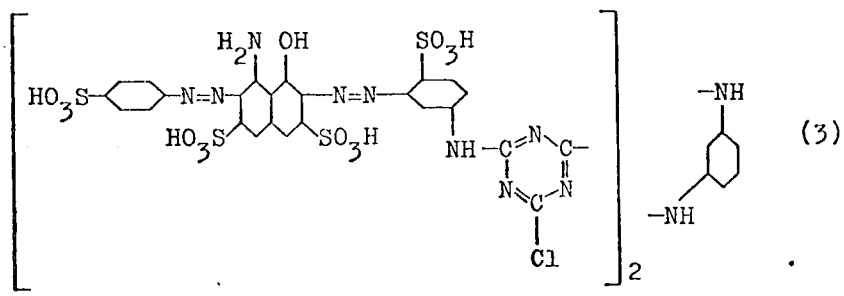

The tetrazo dyes of the formula (1) are fibre-reactive on account of the two monohalogeno-1,3,5-triazine radicals present in the molecule of the tetrazo dyes of the formula (1). By fibre-reactive compounds are meant those which are able to react with the hydroxy groups of cellulose or with the amino groups by natural or synthetic polyamides to form covalent chemical bonds.

The fibre-reactive tetrazo dyes of the formula (1) are manufactured by reacting diazo compounds of suitable aminobenzenesulphonic acids and diaminobenzenesulphonic acids, 1-amino-8-hydroxynaphthalene-3,6-disulphonic acid, 2,4,6-trihalogeno-1,3,5-triazine and a diaminobenzene with one another by two-fold coupling as well as acylation and condensation in such a manner that fibre-reactive tetrazo dyes of the formula (1) are formed. The sequence of the partial reactions, having regard to the starting compounds to be reacted with one another, can be freely chosen.

The coupling to the 1-amino-8-Hydroxynaphthalene-3,6-disulphonic acid in ortho-position to the H₂N group takes place in acid solution, that in ortho-position to the HO group in alkaline solution.

Depending on whether the diazo component is coupled to the 1-amino-8-hydroxy-naphthalene-3,6-disulphonic acid with the residue D₁ in acid solution and with the residue D₂ in alkaline solution or whether the reverse procedure is carried out, fibre-reactive tetrazo dyes of the formula (1) are obtained in which $Y_1$ represents the NH₂ group and $Y_2$ represents the HO group or $Y_1$ represents the HO group and $Y_2$ represents the H₂N group.

It is therefore possible, for example, to first acylate a diaminobenzenesulphonic acid with cyanuric chloride, to diazotise the resultant intermediate and to couple it in acid solution to the 1-amino-8-hydroxynaphthalene-3,6-disulphonic acid, to condense the resultant monoazo compound in twice the molar amount with a diaminobenzene and to couple two moles of a diazotised aminobenzenesulphonic acid to the disazo compound which has been formed.

In the resultant fibre-reactive tetrazo compound of the formula (1), $Y_1$ represents the HO group and $Y_2$ represents the H₂N.

On the other hand, if a diazotised aminobenzenesulphonic acid is first coupled in acid solution to the 1-amino-8-hydroxynaphthalene-3,6-disulphonic acid, and a diaminobenzenesulphonic acid is then acylated with cyanuric chloride, and if the acylation product is condensed with a diaminobenzene in the molar ratio 2:1, and the resultant bis-(4-aminosulphophenyl-amino-6-chloro-triazin-2-yl-amino)-benzene is tetrazotised and coupled in alkaline solution to the 2-sulphophenyl-azo-1-amino-8-hydroxynaphthalene-3,6-disulphonic acid obtained by the coupling in acid solution described hereinbefore, there is obtained a fibre-reactive tetrazo dye of the formula (1) in which $Y_1$ represents the H₂N group and $Y_2$ represents the HO group. In this case, as already described, it is necessary to carry out the coupling first in acid solution.

According to another modification of the process, it is possible to couple first an aminobenzenesulphonic acid in acid solution and subsequently a diaminobenzenesulphonic acid in alkaline solution to the 1-amino-8-hydroxynaphthalene-3,6-disulphonic acid and to condense the resultant diazo compound with a bis-(4,6-dichlorotriazin-2-yl-amino)-benzene in the molar ratio 2:1.

For the coupling reactions in which a diaminobenzenesulphonic acid is used as diazo component, it is desirable not to use this itself but an amino-acylamino-benzenesulphonic acid instead from which, after termination of the coupling, the acyl group (e.g the acetyl group) is splitt off by saponification before the further condensation.

It is technically advantageous to carry out the condensation with the diaminobenzene with the residue B as final reaction step.

According to this modification of the process, the fibre-reactive tetrazo dyes of the formula (2) are obtained by reacting an aminobenzenesulphonic acid, a diaminobenzenesulphonic acid, 1-amino-8-hydroxynaphthalene-3,6-disulphonic acid and cyanuric chloride by two-fold coupling as well as acylation to yield a disazotriazine compound of the formula

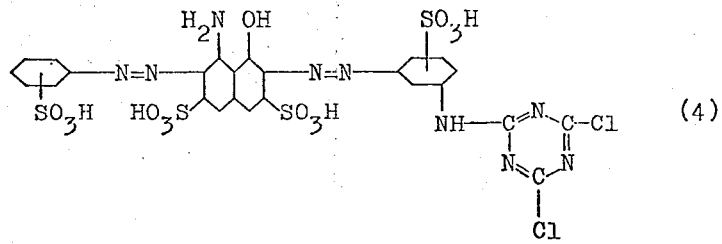  (4)

and condensing this compound with a diaminobenzene of the formula

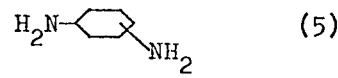  (5)

in the molar ratio 2:1.

The useful fibre-reactive tetrazo dye of the formula (3) can therefore be manufactured by reacting sulphanilic acid 1,3-diaminobenzene-6-sulphonic acid, 1-amino-8-hydroxynaphthalene-3,6-disulphonic acid and cyanuric chloride by two-fold coupling as well as acylation to give the disazotriazine compound of the formula

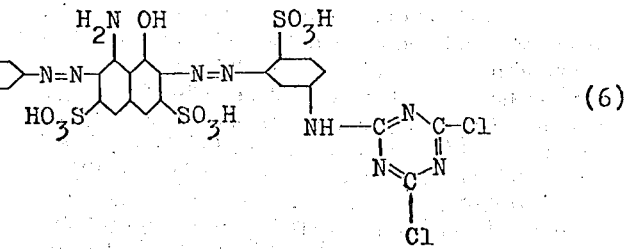  (6)

and condensing this compound with 1,3-diaminobenzene in the molar ratio 2:1.

The diazotisation of the aminobenzenesulphonic acids with the residue D₁ and of the diamonobenzenesulphonic acids with the residue D₂ is effected by methods which are known per se, for example with hydrochloric acid and sodium nitrite. The coupling reactions with the 1-amino-8-hydroxynaphthalene-3,6-disulphonic acid are also carried out by methods which are known per se in aqueous acid or alkaline medium.

The acylations with 2,4,6-trihalogeno-1,3,5-triazines and the condensations with diaminobenzenes with the residue B are desirable carried out using acid acceptors, e.g. sodium carbonate or sodium hydroxide, and under such conditions that, in the intermediate of the formula (4) or (6), two chlorine atoms and in the final tetrazo dye of the formula (1) one halogen atom, still remain at the 1,3,5-triazine ring, i.e. in organic solvents or at relatively low temperatures in aqueous medium.

As starting materials for the manufacture of the fibre-reactive tetrazo compounds of the formula (1) there may be cited:

diazo components:

a.
1-aminobenzene-2-, -3- or -4-sulphonic acid
1-amino-4-methylbenzene-2-sulphonic acid
1-amino-3-chlorobenzene-4-sulphonic acid
1-amino-4-nitrobenzene-2-sulphonic acid
1-amino-6-nitrobenzene-4-sulphonic acid
1-amino-4-methoxybenzene-2-sulphonic acid
1-aminobenzene-2,5-disulphonic acid b.
1,4-diaminobenzene-2-sulphonic acid
1,4-diaminobenzene-2,5-disulphonic acid
1,4-diaminobenzene-2,6-disulphonic acid
1,3-diaminobenzene-4-sulphonic acid
1,3-diaminobenzene-4,6-disulphonic acid;

coupling component:
1-amino-8-hydroxynaphthalene-3,6-disulphonic acid;

2,4,6-trihalogeno-1,3,5-triazines:
cyanuric chloride, bromide or fluoride;

diaminobenzenes:
1,3-diaminobenzene
1,4-diaminobenzene
1,3-diamino-4-chloro-benzene
1,3-diamino-4-methyl-benzene
1,3-diamino-4-ethyl-benzene
1,3-diamino-4-methoxy-benzene
1,3-diamino-4-ethoxy-benzene.

The new fibre-reactive tetrazo dyes of the formula (1) can be isolated and processed to useful, dry, dyeing preparations. The isolation is preferably effected by salting out and filtration at as low temperatures as possible. The filtered dyes can optionally be dried after the addition of extenders and/or buffers, for example after the addition of a mixture of equal parts of monosodium and disodium phosphate. The drying is preferably carried out at not too elevated temperatures and under reduced pressure. By spray drying the whole manufacturing mixture it is possible in certain cases to manufacture the dye preparations according to the invention direct, i.e. without first isolating the dyes.

The dyes are suitable for dyeing and printing materials of the most diverse kind, for example silk, leather, wool, polyamide fibres and polyurethanes, especially, however, cellulosic materials of fibrous structure, for example linen, cellulose, regenerated cellulose and, above all, cotton. They are especially suitable for dyeing by the exhaustion process from a dilute bath, from an alkaline aqueous bath which optionally contains large amounts of salt, and by the pad dyeing process, in which the goods are impregnated with aqueous and optionally also salt-containing dye solutions and the dyes are fixed after an alkali treatment or in the presence of the alkali, optionally accompanied by a heat treatment.

The dyes are also suitable for printing, particularly on cotton, and also for printing nitrogenous fibres, e.g. wool, silk or blended fabrics which contain wool. They are characterized above all by increased reactivity and a good affinity and consequently by a high degree of fixation. The easy removability of non-fixed amounts of dye is a further distinguishing feature. The dyeings and prints obtained are very strong and have good fastness to light as well as very good wet fastness properties, for example good fastness to washing.

In order to improve the wet fastness properties, it is advisable to subject the dyeings and prints to a thorough rinsing with cold and hot water, optionally with the addition of an agent which has a dispersing effect and promotes the diffusion of the non-fixed amounts of dye.

The following Examples illustrate the invention, the parts and percentages being by weight unless otherwise stated. The relationship between parts by weight and parts by volume is the same as that between gram and cubic centimetre.

EXAMPLE 1

51.8 parts of the monoazo dye obtained by the acid coupling of diazotised sulphanilic acid to 1-amino-8-hydroxynaphthalene-3,6-disulphonic acid are dissolved in the form of the sodium salt in 500 parts of water. To this solution is added at 5° to 10°C the diazo compound obtained from 33.6 parts of 1-amino-3-(2',4'-dichloro-triazinyl-amino)-benzene-6-sulphonic acid and the pH of the coupling mixture is kept between 7.5 and 8.5 by the dropwise addition of a dilute sodium hydroxide solution. After termination of the coupling, an aqueous solution which contains 5.4 parts of 1,3-diaminobenzene is added and the reaction mixture is gradually heated to 30°C, the pH being kept between 6 and 7 by the dropwise addition of a sodium hydroxide solution. After termination of the condensation, the reaction mixture is evaporated to dryness in vacuo. A dye is obtained which dyes cellulose fibres in very fast, greenish blue shades. The dye has the formula

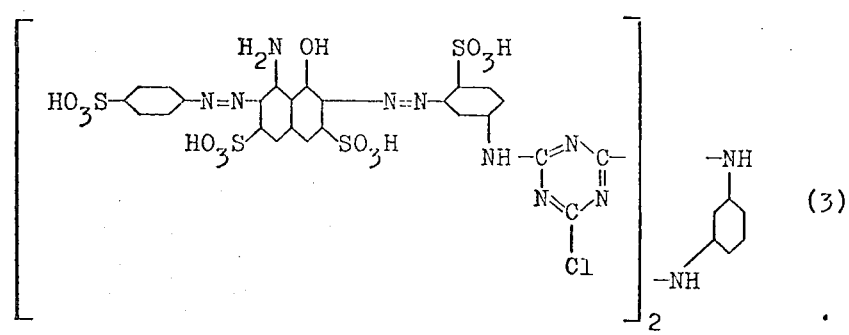

Dyes of similar properties are obtained by using the same amount of 1,4-diaminobenzene or corresponding amounts of 1,3-diamino-4-chlorobenzene or 1,3-diamino-4-methylbenzene as bridge-forming diamine instead of 1,3-diaminobenzene. Dyes which also dye cellulose fibres in fast, greenish blue shades are obtained by substituting 1-aminobenzene-3-sulphonic acid, 1-aminobenzene-2-sulphonic acid, 1-amino-4-chlorobenzene-2-sulphonic acid, 1-aminobenzene-2,5-or -2,4-sulphonic acid or 1-amino-4-methylbenzene-2-sulphonic acid for the 1-aminobenzene-4-sulphonic acid used in this Example for the manufacture of the monoazo dye.

EXAMPLE 2

51.8 parts of the monoazo dye obtained by the acid coupling of diazotised sulphanilic acid to 1-amino-8-hydroxynaphthalene-3,6-disulphonic acid are dissolved in the form of the sodium salt in 500 parts of water. To this solution is added at 5° to 10°C the diazo compound obtained from 23 parts of 4-acetylamino-1-aminobenzene-2-sulphonic acid and the pH of the coupling mixture is kept between 6 and 8 by the dropwise addition of a dilute sodium hydroxide solution. After termination of the coupling, sufficient 10 normal sodium hydroxide solution is added to give a 5% solution and this is kept for 2 hours at 90° to 95°C in order to split ff the acetyl group. The resultant aminoazo dye is precipitated by acidifying with hydrochloric acid and salting out with sodium chloride, filtered off and dissolved in about 1000 parts of water with the addition of sodium carbonate at pH 7.5. A solution of 18.5 parts of cyanuric chloride in 60 parts of acetone is added thereto and the mixture is stirred for 2 hours at 0° to 5°C at a pH between 5 and 6. Then an aqueous solution which contains 5.4 parts of 1,4-diaminobenzene is added, the reaction mixture is heated to 40°C and the ph is kept between 6 and 7 by the dropwise addition of a dilute solution of sodium hydroxide. After termination of the condensation, the dye is precipitated, filtered off and dried. It dyes cellulose fibres in strong, greenish blue shades.

The dye has the formula

Dyes with similar properties are obtained by using the corresponding amount of cyanuric bromide or cyanuric fluoride instead of cyanuric chloride. By using cyanuric fluoride, a dye is obtained which, in the exhaustion process, fixes at lower temperature in the presence of sodium chloride and alkali.

EXAMPLE 3

25.3 parts of 3-acetylamino-1-aminobenzene-6-sulphonic acid are diazotised in 500 parts of water with hydrochloric acid and sodium nitrite. The resultant strongly acid diazo comppound is treated with 32 parts of 1-amino-8-hydroxy-naphthalene-3,6-disulphonic acid in the form of the monosodium salt and the mixture is stirred at room temperature until no more diazo compound can be detected. The coupling mixture is then neutralised with sodium hydroxide solution, treated first with 20 parts of sodium bicarbonate and then with the diazo compound obtained from 17.3 parts of sulphanilic acid. After termination of the coupling, sufficient sodium hydroxide is added to give a 6% solution and this is heated for 2 hours to 90°C in order to split off the acetyl group. After acidification with hydrochloric acid, the aminazo dye is precipitated with sodium chloride, filtered off and again dissolved neutral in 1000 parts of water with the addition of sodium carbonate. A solution of 18.5 parts of cyanuric chloride in 80 parts of acetone is added and the mixture is stirred for 2 hours between 0° and 10°C, the pH being kept between 5 and 6 by the dropwise addition of a dilute sodium hydroxide solution. Then an aqueous solution of 5.4 parts of 1,3-diaminobenzene is added and the reaction mixture is stirred for 2 hours between 30° and 40°C, the pH being kept between 6 and 7. After termination of the condensation, the resultant dye is salted out, filtered off and dried. It dyes cellulose fibres in strong, greenish blue shades. The dye has the formula

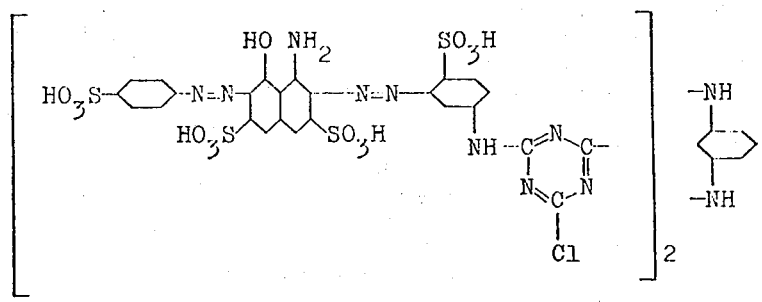

A similar dye is obtained by using the same amount of 1,4-diaminobenzene instead of 1,3-diaminobenzene.

Dyeing Instruction I 2 parts of the dyestuff of Example 1 are dissolved in 100 parts of water with the addition of 0.5 parts of

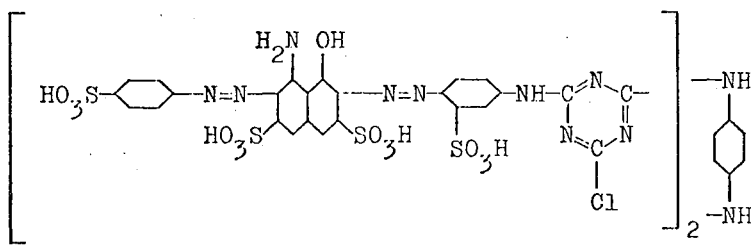

sodium m-nitrobenzenesulphonate. A cotton fabric is impregnated with this solution to 75% liquid pick-up and dried.

The fabric is then impregnated with a solution of 20°C which contains, per litre, 5 g of sodium hydroxide and 300 g of sodium chloride, squeezed out to 75% liquid pick-up, and steamed at 100°C to 101°C for 60 seconds. The fabric is then rinsed, soaped at the boil for a quarter of an hour in a 0.3% solution of an ion-free detergent, rinsed, and dried.

Dyeing Instruction II 2 parts of the dyestuff obtained according to Example 1 are dissolved in 100 parts of water.

The solution is added to 3900 parts of cold water, 80 parts of sodium chloride are added, and 100 parts of a cotton fabric are put into this dyebath.

Within 45 minutes the temperture is raised to 90°C, and after 30 minutes 40 parts of trisodium phosphate and a further 80 parts of sodium chloride are added. The temperature is kept for 30 mixutes at 90°C, and the fabric is rinsed and then soaped for 15 minutes in a 0.3% boiling solution of an ion-free detergent, then rinsed and dried. A greenish blue dyeing which is fast to washing and light is obtained.

Printing Instruction

With rapid stirring, 2 parts of the dyestuff manufactured according to Example 1 are sprinkled into 100 parts of a stock thickening containing 45 parts of 5% sodium alginate thickener, 32 parts of water, 20 parts of urea, 1 part of sodium m-nitrobenzenesulphonate, and 2 parts of sodium carbonate.

A cotton fabric is printed on a roller printing machine with the resultant printing paste and the printed material is steamed for 8 minutes at 100°C in saturated steam. The printed fabric is then thoroughly rinsed in cold and hot water, whereby it is possible to remove the non-chemically fixed constituents very easily and subsequently dried.

We claim:

1. A fibre-reactive tetraxo dye of the formula

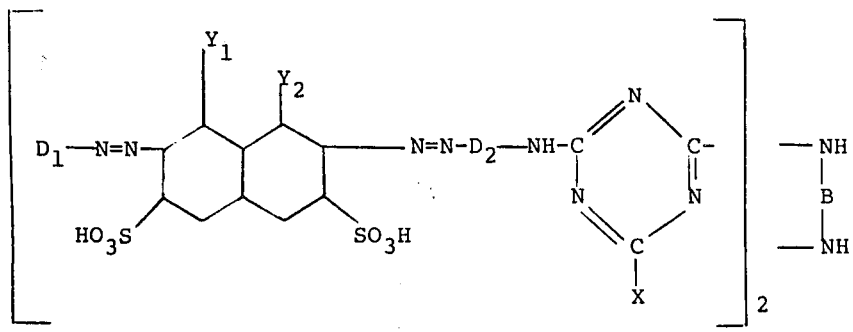

wherein each of $D_1$ and $D_2$ represents mono- or di-sulfophenyl which is further unsubstituted or substituted by methyl, chloro, nitro or methoxy;

one of $Y_1$ and $Y_2$ represents HO- and the other represent $H_2N$;

X represents halo; and

B represents phenylene which is unsubstituted or substituted by chloro, methyl, ethyl, methoxy or ethoxy.

2. A fibre-reactive tetrazo dye according to claim 1, of the formula

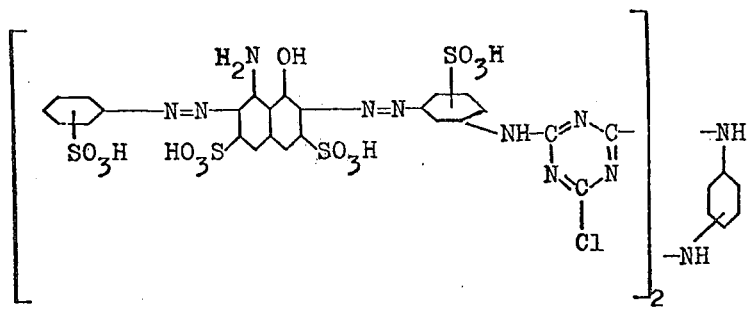

3. A fibre-reactive tetrazo dye according to claim 2, of the formula

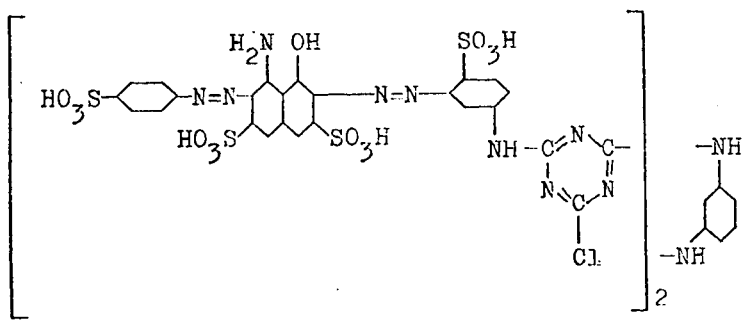

* * * * *